(12) United States Patent
Scharting

(10) Patent No.: US 10,197,100 B2
(45) Date of Patent: Feb. 5, 2019

(54) BEARING ARRANGEMENT FOR A DEEP DRILLING DEVICE

(71) Applicant: Schaeffler Technologies AG & Co. KG, Herzogenaurach (DE)

(72) Inventor: Stefan Scharting, Gochsheim (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/513,746

(22) PCT Filed: Sep. 3, 2015

(86) PCT No.: PCT/DE2015/200451
§ 371 (c)(1),
(2) Date: Mar. 23, 2017

(87) PCT Pub. No.: WO2016/058602
PCT Pub. Date: Apr. 21, 2016

(65) Prior Publication Data
US 2017/0284469 A1  Oct. 5, 2017

(30) Foreign Application Priority Data
Oct. 14, 2014 (DE) .................... 10 2014 220 792

(51) Int. Cl.
*F16C 19/08* (2006.01)
*F16C 19/18* (2006.01)
(Continued)

(52) U.S. Cl.
CPC .......... *F16C 33/6681* (2013.01); *F16C 17/02* (2013.01); *F16C 19/08* (2013.01);
(Continued)

(58) Field of Classification Search
CPC ........ F16C 19/08; F16C 19/18; F16C 19/181; F16C 19/182; F16C 19/54; F16C 21/00;
(Continued)

(56) References Cited

U.S. PATENT DOCUMENTS

| 7,008,113 B2* | 3/2006 | Herles ................. F16C 33/3713 384/192 |
| 2003/0138173 A1 | 7/2003 | Herles et al. |
| 2014/0116780 A1 | 5/2014 | Chustz |

FOREIGN PATENT DOCUMENTS

| DE | 1907632 | 12/1964 |
| DE | 2527237 | 1/1977 |

(Continued)

*Primary Examiner* — James Pilkington
(74) *Attorney, Agent, or Firm* — Volpe and Koenig, P.C.

(57) ABSTRACT

A bearing arrangement is disclosed for a drilling head, through which flushing liquid flows, of a deep drilling device, having multiple radially outer and radially inner bearing rings. Radially outer bearing rings are arranged coaxially over radially inner bearing rings, balls roll in raceways of the bearing rings, and the raceways are delimited axially on both sides by shoulders with mutually opposite shoulder surfaces. In order for a bearing arrangement to be of short axial extent and to simplify the construction, the internal diameter (Di) of the shoulder surfaces of the radially outer bearing rings and the external diameter (Da) of the shoulder surfaces of the radially inner bearing rings are dimensioned such that the shoulder surfaces perform the function of parallel radial plain bearings with a radial clearance (S).

15 Claims, 2 Drawing Sheets

(51) Int. Cl.
*F16C 19/52* (2006.01)
*F16C 21/00* (2006.01)
*F16C 33/37* (2006.01)
*F16C 33/60* (2006.01)
*F16C 33/66* (2006.01)
*F16C 17/02* (2006.01)
*F16C 39/02* (2006.01)

(52) U.S. Cl.
CPC .......... *F16C 19/181* (2013.01); *F16C 19/522* (2013.01); *F16C 21/00* (2013.01); *F16C 33/3713* (2013.01); *F16C 33/60* (2013.01); *F16C 39/02* (2013.01); *F16C 2240/46* (2013.01); *F16C 2240/70* (2013.01); *F16C 2352/00* (2013.01)

(58) Field of Classification Search
CPC .............. F16C 33/3713; F16C 33/6681; F16C 2352/00
USPC .................................. 384/126–128
See application file for complete search history.

(56) References Cited

FOREIGN PATENT DOCUMENTS

DE          10162473      12/2005
JP          2008243694   * 10/2008

* cited by examiner

BEARING ARRANGEMENT FOR A DEEP DRILLING DEVICE

BACKGROUND

The invention relates to a bearing arrangement for a drill head of a deep drilling device, wherein a flushing liquid flows through this drill head, with multiple radially outer and radially inner bearing rings in which the radially outer bearing rings are arranged coaxial over the radially inner bearing rings, in which balls are arranged radially between the bearing rings, wherein these balls roll in raceways of the bearing rings and in which the raceways are bounded axially on both sides by shoulders with shoulder surfaces that are opposite each other and extending parallel to a bearing longitudinal axis.

Such a bearing arrangement of a deep drilling device is known from DE 101 62 473 B4. It comprises a larger number of ball bearings that are arranged axially one behind the other and are constructed as 4-point ball bearings and combined to form a ball bearing assembly. For these 4-point ball bearings, the radially outer bearing rings and the radially inner bearing rings have a divided construction. It is known that 4-point ball bearings can transmit both axial forces and also radial forces, but frequently a sliding or plain bearing is still arranged axially in front of and/or behind the ball bearing assembly, in order to relieve the 4-point ball bearing from radial forces that are too large. Here, the bearing arrangement is extended axially around this at least one plain bearing, so that such a bearing arrangement requires a larger packaging space in the longitudinal direction and the minimum possible radius for changes in direction is disadvantageously increased for articulated drill heads.

SUMMARY

In light of this information, the invention is based on the object of providing a bearing arrangement that has both radial plain bearings and also axial ball bearings and whose axial extent corresponds essentially to a bearing arrangement made exclusively from 4-point ball bearings.

This object is achieved by a bearing arrangement with one or more features of the invention as described below. Advantageous refinements are defined in the subordinate claims.

Accordingly, the invention starts from a bearing arrangement for a drill head of a deep drilling device, wherein a flushing liquid flows through this drill head, with multiple radially outer and radially inner bearing rings, in which the radially outer bearing rings are arranged coaxial over the radially inner bearing rings, in which balls are arranged radially between the bearing rings, wherein these balls roll in raceways of the bearing rings and in which the raceways are bounded axially on two sides by shoulders with shoulder surfaces that are opposite each other and extend parallel to a bearing longitudinal axis. For this bearing arrangement and for meeting the stated object, it is provided that the inner diameter of the shoulder surfaces of the radially outer bearing rings and the outer diameter of the shoulder surfaces of the radially inner bearing rings are dimensioned so that there is a radial play producing the function of parallel radial plain bearings.

Therefore, because the shoulder surfaces of the shoulders on both sides of the raceways of the 4-point ball bearing form plain bearings, a combination bearing is created that has multiple axial-radial rolling bearings and radial plain bearings whose length corresponds exactly to the length that has a bearing assembly consisting only from 4-point ball bearings. A separate plain bearing to be arranged axially behind or in front of the assembly made from 4-point ball bearings according to the prior art is not needed, which saves costs. In addition, the integration of the radial guidance into the axial bearings can reduce the axial length of the entire bearing arrangement. Here, the distance between the drill head and a bend for directed holes can be shortened. This allows advantageously smaller radii of the drill string.

According to one advantageous embodiment, the shoulder surfaces of the radially inner and/or radially outer bearing rings have grooves for guiding the flushing liquid if the flow rate through the bearing arrangement is not sufficient due to the adjusted radial bearing play. Preferably, the grooves can be arranged with respect to the bearing longitudinal axis at an angle to cause only a break in the lubricating film of the plain bearing based on the width of the grooves.

To simplify the assembly of a 4-point ball bearing of the ball bearing area of the bearing arrangement according to the invention, the radially outer and/or radially inner bearing rings can have a split design in a plane that runs perpendicular to the bearing longitudinal axis centrally through the raceways.

The bearing arrangement has at least one row of balls with the associated bearing rings. The axially end-side end rings of the bearing arrangement can be longer than is typical for 4-point ball bearings for drill heads for comparable operating loads, especially for reducing the wear and the surface pressure in the radial plain bearing.

Preferably it is provided that multiple rows of balls are assembled with the associated bearing rings to form a bearing assembly and that the end rings have a longer construction than the bearing rings arranged between these end rings.

By integrating the radial plain bearings into the axial-radial rolling bearings formed as 4-point bearings, the axial distance of the radial support points is reduced, which increases the tipping moment for the same applied force. To reduce this effect, the number of rows of balls with the associated bearing rings can be greater than is typical for conventional 4-point bearings for drill heads for comparable operating loads.

Because a flushing liquid flows through the bearing arrangement and this liquid contains unavoidable contaminants that lead to quick wear of the bearing arrangement, it can be provided that at least the shoulder surfaces of the radially outer bearing rings and/or the shoulder surfaces of the radially inner bearing rings are provided with a friction-reducing and/or wear-reducing coating that preferably is formed of a tribological coating system. This tribological coating system can be applied by means of the Triondur® method. Triondur® is a registered trademark of the applicant. In particular, the friction-reducing and/or wear-reducing coating can be made from diamond layers.

BRIEF DESCRIPTION OF THE DRAWINGS

The invention is explained in more detail below with reference to embodiments shown in the drawing. Shown in this drawing are.

DETAILED DESCRIPTION OF THE PREFERRED EMBODIMENTS

Figure 1:
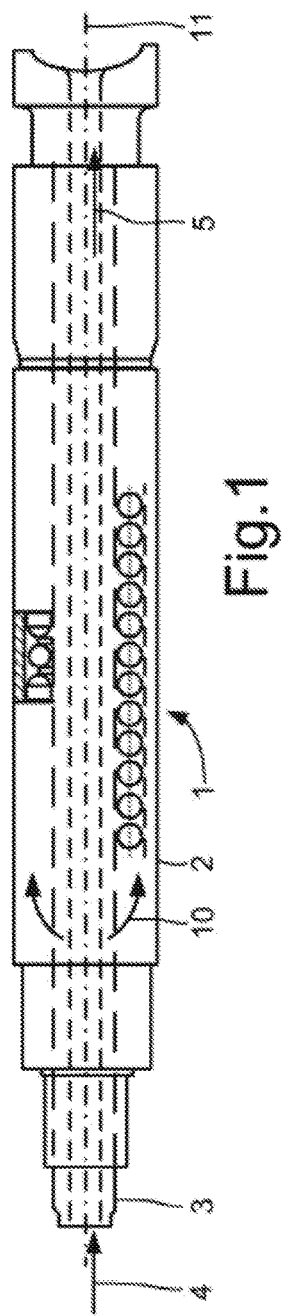
FIG. 1 a drive shaft of a drill head with a bearing arrangement.

Accordingly, a bearing arrangement 1 of a drive shaft of a drill head is shown in FIG. 1. The drive shaft is arranged radially within the bearing arrangement 1 and is constructed as a hollow shaft 3. The hollow shaft 3 is supported by the bearing arrangement 1 in a rotationally locked housing 2 and transmits a drive torque from a drive turbine (not shown) to the drill head (not shown). A flushing liquid is introduced into the hollow shaft 3 according to the direction of flow 4 with which the drive turbine is operated. A part of the flushing liquid is guided through outlet openings 10 in the hollow shaft 3 into the bearing arrangement 1 axially in front of the bearing arrangement 1, in order to cool and lubricate the rolling bearings there and also to form a load-bearing film in the plain bearing integrated into the bearing arrangement. With a greater portion of the flushing liquid that is discharged from the hollow shaft 3 in the area 5 through openings in this shaft, the drill head is then cooled and lubricated. Because the flushing liquid is always somewhat contaminated, contaminants are constantly coming into the bearing arrangement 1.

Figure 2:
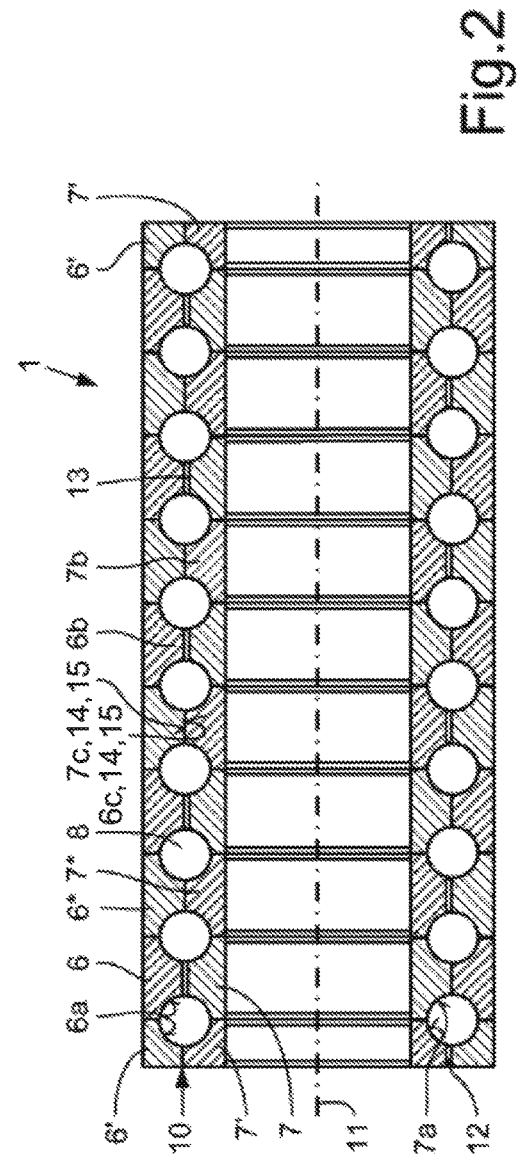
FIG. 2 the bearing arrangement according to FIG. 1 in schematic longitudinal section according to a first embodiment of the invention, FIG. 3 a second embodiment of the bearing arrangement according to FIG. 1, and FIG. 4 a radial cross section through the bearing arrangement of FIGS. 2 and 3.

FIG. 2 shows the bearing arrangement 1 of FIG. 1 that is formed according to a first embodiment and supports the hollow shaft 3 in the housing 2. In this bearing arrangement 1, multiple full-sphere radial-axial ball bearings (4-point bearings) are arranged in a row axially one behind the other to form an assembly. Each of the 4-point bearings has two radially outer bearing rings 6, 6* and two radially inner bearing rings 7, 7*. Every two axially directly adjacent radially outer bearing rings 6, 6* together form a radially outer running groove 6a and every two axially directly adjacent radially inner bearing rings 7, 7* together form a radially inner running groove 7a. The two raceways 6a, 7a of each 4-point bearing are consequently radially divided by a separating plane that is perpendicular to the bearing longitudinal axis 11.

Figure 3:
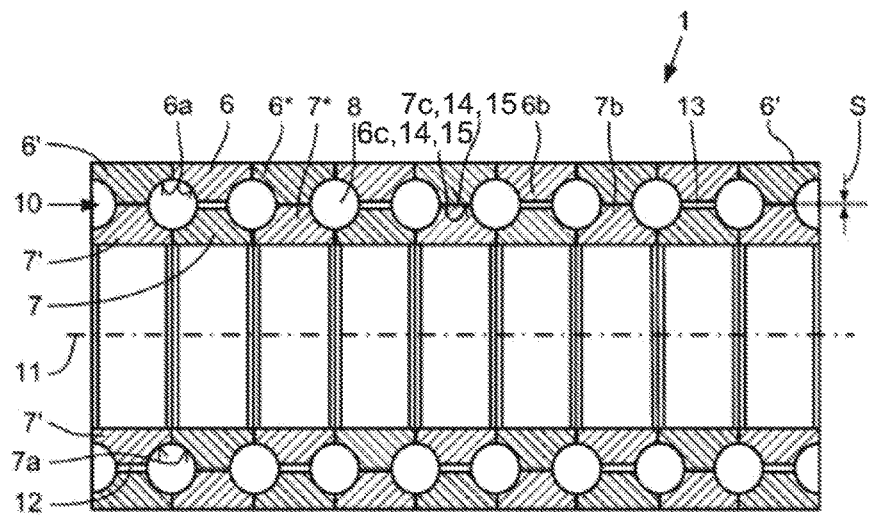

The bearing arrangement 1 shown in FIG. 2 has, on each axial end side, an end ring 6', 7' that is shorter in comparison with the other bearing rings 6, 7. Accordingly, the end rings 6', 7' are formed in the second embodiment according to FIG. 3 geometrically and length-wise identical to the other bearing rings 6, 6*, 7, 7*. The axially longer end rings 6', 7' are advantageous for reducing the wear and the surface pressure in the end rings 6', 7' through applied tilting moments. In this case, it is also possible to form the end rings 6', 7' without the half raceways shown in FIG. 3.

Figure 4:
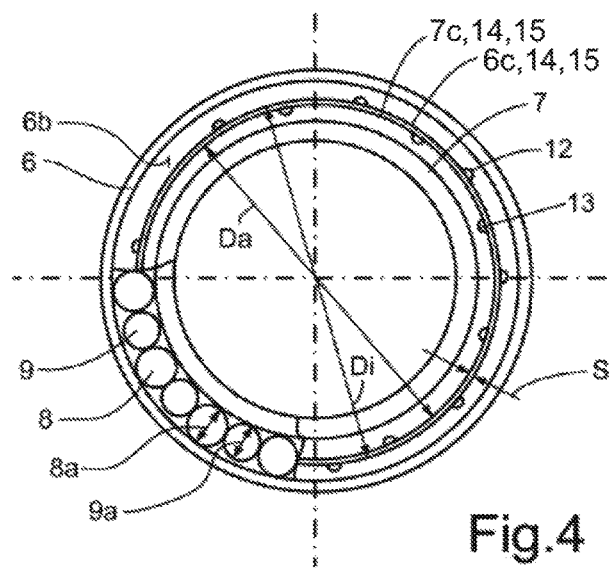

In the raceways 6a, 7a, there are load-bearing balls 8 that are preferably formed as ceramic balls. Between two of the load-bearing ceramic balls 8 there is a preferably somewhat smaller separating ball 9 made from steel. The arrangement of the balls 8, 9 made from steel and ceramic is shown in FIG. 4 in a radial cross section through the bearing arrangement 1. In every individual 4-point bearing of the bearing arrangement 1, load-bearing ceramic balls 8 and separating steel balls 9 are inserted. The radially outer bearing rings 6, 6*, 6' and the radially inner bearing rings 7, 7*, 7' consist of steel. The steel balls 9 can be made from a rolling bearing steel, a stainless rolling bearing steel, or a wear-resistant steel.

The radially outer bearing rings 6, 6* and the radially inner bearing rings 7, 7* have axial shoulders 6b or 7b that end in radial shoulder surfaces 6c, 7c. Accordingly, these radial shoulder surfaces 6c, 7c extend axially between the adjacent raceways 6a, 7a. The inner diameter Di of the shoulder surfaces 6c of the shoulders 6b on the radially outer bearing rings 6, 6*, 6' and the outer diameter Da of the shoulder surfaces 7c of the shoulders 7b on the radially inner bearing rings 7, 7*, 7' are dimensioned so that a radial play S is formed between the radially opposite shoulder surfaces 6c, 7c. This radial play S allows these shoulder surfaces 6c, 7c to exert the function of parallel radial plain bearing surfaces. The radial play S between the radially opposite shoulder surfaces 6c, 7c only equals a few hundredths of a millimeter. In these embodiments, in the shoulders 7b of the radial inner bearing rings 7, 7*, 7' there are grooves 13 and grooves 12 in the shoulders 6b of the radially outer bearing rings 6, 6*, 6', in order to guarantee a sufficient flow rate of the flushing liquid through the bearing arrangement 1. These grooves 12, 13 are shown running in the axial direction in FIG. 3, but it is preferred that these grooves 12, 13 are formed at an angle to the bearing longitudinal axis 11, in order to not break the load-bearing film of the flushing liquid over the entire width of the bearing rings 6, 6*, 6', 7, 7*, 7'.

FIG. 4 shows a row of balls of a 4-point bearing of the bearing arrangement in the axial top view. The load-bearing ceramic balls 8 recognizably have a diameter 8a that is slightly larger than the diameter 9a of the circumferentially adjacent steel balls 9. In this figure it is clearly shown that the ceramic balls 8 have, as rolling partners, only bearing components, namely the steel balls 9 and the two allocated bearing rings 6, 6*, 6', 7, 7*, 7'. The smaller steel balls 9 in diameter 9a must be much smaller than the ceramic balls 8 so that for a maximum loading of the bearing arrangement 1, these separating steel balls 9 do not become load-bearing balls. The ceramic balls 8 can be made from solid ceramic or from a carrier material that is coated with ceramic. The ceramic material can be made, for example, from silicon nitride or zirconium oxide.

FIG. 4 also shows the play S produced between the shoulder surfaces 6c and 7c, because the inner diameter Di of the shoulder surfaces 6c is slightly larger than the outer diameter Da of the shoulder surfaces 7c. In addition, the grooves 12 and 13 can also be seen in the shoulders 6b and 7b that benefit the flow rate of the flushing liquid through the bearing arrangement 1.

At least the shoulder surfaces 6c of the radially outer bearing rings 6, 6*, 6' and/or the shoulder surfaces 7c of the radially inner bearing rings 7, 7*, 7' are provided with a friction-reducing and/or wear-reducing coating 14, 15 that is preferably made from a tribological coating system that is applied, for example, by the Triondur® method. Preferably, but not exclusively, these friction-reducing and/or wear-reducing coatings 14, 15 are diamond layers.

LIST OF REFERENCE NUMBERS

1 Bearing arrangement
2 Housing
3 Hollow shaft, drive shaft
4 Direction of flow of the flushing liquid
5 Outlet of the flushing liquid
6, 6* Radially outer bearing rings
6a Raceways in the outer bearing rings 6, 6*
6b Shoulders on the outer bearing rings 6, 6*, 6'
6c Shoulder surfaces on the shoulders 6b
6' Radially outer end ring
7, 7* Radially inner bearing rings
7a Raceways in the inner bearing rings 7, 7*
7b Shoulders on the inner bearing rings 7, 7*, 7'

7c Shoulder surfaces on the shoulders 7b
7' Radially inner end ring
8 Load-bearing ceramic balls
8a Diameter of load-bearing ceramic balls
9 Separating steel balls
9a Diameter of separating steel balls
10 Outlet openings in the hollow shaft for the flushing liquid
11 Bearing longitudinal axis
12 Grooves in the shoulders 6b
13 Grooves in the shoulders 7b
14 Coating
15 Coating
Di Inner diameter of shoulder surfaces 6c
Da Outer diameter of shoulder surfaces 7c
S Radial play between the shoulder surfaces 6c and 7c

The invention claimed is:

1. A bearing arrangement for a drill head of a deep drilling device in which a flushing liquid flows through the drill head, the bearing arrangement comprising multiple radially outer and radially inner bearing rings, the radially outer bearing rings are arranged coaxial over the radially inner bearing rings, balls are arranged radially between the radially outer and radially inner bearing rings, said balls roll in raceways of the radially outer and radially inner bearing rings, the raceways are axially bounded on two sides by shoulders of the radially outer and radially inner bearing rings, the shoulders having shoulder surfaces and the shoulder surfaces of the radially outer bearing rings are opposite to the shoulder surfaces of the radially inner bearing rings and the shoulder surfaces run parallel to a bearing longitudinal axis, an inner diameter (Di) of the shoulder surfaces of the radially outer bearing rings and an outer diameter (Da) of the shoulder surfaces of the radially inner bearing rings are dimensioned so that a radial play (S) is formed,
wherein the shoulder surfaces of at least one of the radially inner bearing rings or radially outer bearing rings have grooves for guiding the flushing liquid.

2. The bearing arrangement according to claim 1, wherein each said radially outer bearing ring, each said radially inner bearing ring, or each said radially outer bearing ring and each said radially inner bearing ring is divided in a plane perpendicular to the bearing longitudinal axis to form a 4-point bearing.

3. The bearing arrangement according to claim 1, wherein multiple rows of the balls are assembled with associated radially inner and radially outer bearing rings to form a bearing assembly and the bearing rings that are end rings have an axially shorter design than the bearing rings arranged between said end rings.

4. The bearing arrangement according to claim 1, wherein ten rows of the balls with the associated bearing rings are provided.

5. The bearing arrangement according to claim 1, wherein at least one of the shoulder surfaces of the radially outer bearing rings or the shoulder surfaces of the radially inner bearing rings are provided with at least one of a friction-reducing or wear-reducing coating.

6. The bearing arrangement according to claim 5, wherein the at least one of the friction-reducing or wear-reducing coating is formed of a tribological layer system.

7. The bearing arrangement according to claim 6, wherein the at least one of the friction-reducing or wear-reducing coating has diamond layers.

8. A drill head for a deep drilling device comprising the bearing arrangement of claim 1, wherein the bearing arrangement is made exclusively from 4-point ball bearings.

9. A bearing arrangement for a drill head of a deep drilling device in which a flushing liquid flows through the drill head, the bearing arrangement comprising multiple radially outer and radially inner bearing rings, the radially outer bearing rings are arranged coaxial over the radially inner bearing rings, balls are arranged radially between the radially outer and radially inner bearing rings, said balls roll in raceways of the radially outer and radially inner bearing rings and the raceways are axially bounded on two sides by shoulders of the radially outer and radially inner bearing rings, the shoulders having shoulder surfaces and the shoulder surfaces of the radially outer bearing rings are opposite to the shoulder surfaces of the radially inner bearing rings and the shoulder surfaces run parallel to a bearing longitudinal axis, an inner diameter (Di) of the shoulder surfaces of the radially outer bearing rings and an outer diameter (Da) of the shoulder surfaces of the radially inner bearing rings are dimensioned so that a radial play (S) is formed,
wherein multiple rows of the balls are assembled with associated radially inner and radially outer bearing rings to form a bearing assembly and the bearing rings that are end rings have an axially shorter design than the bearing rings arranged between said end rings.

10. The bearing arrangement according to claim 9, wherein each said radially outer bearing ring, each said radially inner bearing ring, or each said radially outer bearing ring and each said radially inner bearing ring is divided in a plane perpendicular to the bearing longitudinal axis to form a 4-point bearing.

11. The bearing arrangement according to claim 9, wherein ten rows of the balls with the associated bearing rings are provided.

12. The bearing arrangement according to claim 9, wherein at least one of the shoulder surfaces of the radially outer bearing rings or the shoulder surfaces of the radially inner bearing rings are provided with at least one of a friction-reducing or wear-reducing coating.

13. The bearing arrangement according to claim 12, wherein the at least one of the friction-reducing or wear-reducing coating is formed of a tribological layer system.

14. The bearing arrangement according to claim 13, wherein the at least one of the friction-reducing or wear-reducing coating has diamond layers.

15. A drill head for a deep drilling device comprising the bearing arrangement of claim 9, wherein the bearing arrangement is made exclusively from 4-point ball bearings.

* * * * *